United States Patent
McNew

(10) Patent No.: US 6,487,990 B1
(45) Date of Patent: Dec. 3, 2002

(54) COLLAPSIBLE, DISPOSABLE LITTER BOX WITH LATCHING HANDLES

(76) Inventor: Barbara Ann McNew, P.O. Box 700, Crown Point, IN (US) 46307

(*) Notice: Subject to any disclaimer, the term of this patent is extended or adjusted under 35 U.S.C. 154(b) by 71 days.

(21) Appl. No.: 09/656,703

(22) Filed: Sep. 7, 2000

Related U.S. Application Data

(60) Provisional application No. 60/152,802, filed on Sep. 8, 1999, and provisional application No. 60/102,978, filed on Oct. 3, 1998.

(51) Int. Cl.[7] .............................................. A01K 1/035
(52) U.S. Cl. ........................................ 119/168; 119/498
(58) Field of Search ................................ 119/168, 498, 119/499

(56) References Cited

U.S. PATENT DOCUMENTS

| | | | |
|---|---|---|---|
| 4,792,082 A | * | 12/1988 | Williamson ............. 119/168 X |
| 5,383,422 A | * | 1/1995 | Morris .................... 119/168 X |
| 5,765,504 A | * | 6/1998 | Evans et al. ................. 119/168 |

* cited by examiner

Primary Examiner—Robert P. Swiatek

(57) ABSTRACT

A one piece disposable litter box comprising of a bottom member and 2 end panels with folding flaps along with 2 side panels forming a rectangle container along with a left and right folding side panels with cutouts and a top member with latching handles and locking tab and a rear support privacy panel forming the collapsible hood.

The litter box is die cut from 1 piece of integral cardboard sheet which when folded in an appropriate fashion results in a compact litter storage container for shipping, storage and disposal.

The litter box may be folded open and held there by the supporting privacy panel to provide an enclosed litter box with one end open and suitable for cats and other small mammals. By reversing this folding procedure the litter box may be returned to its prior dimensional height of approximately 2 inches. The handles are latched into the folded side panels at the perimeter of the cutouts and the locking tab inserted into the corresponding orifice providing a compact, spill resistant container for disposal. The above procedure takes approximately 15 seconds per cycle all the while maintaining the litter box in an undisturbed horizontal plane.

10 Claims, 4 Drawing Sheets

COLLAPSIBLE, DISPOSABLE LITTER BOX WITH LATCHING HANDLES

This appln. claims benefit of Prov. No. 60/102,978 filed Oct. 3, 1998, which claims benefit of Prov. No. 60/152,802 filed Sep. 8, 1999.

BACKGROUND OF THE INVENTION

This invention relates to disposable, litter containers such as would be suitable for a cat or other small animals and includes a method for collapsing, latching and carrying the litter container without disturbing the contents.

BACKGROUND INFORMATION

Disposable litter containers, such as are usable for cats and other small animals popular as household pets, is a crowed field, based on Applicants search of the U.S. Patent Office files available to the public on the Internet.

Providing for and disposing of pet waste such as excrement and urine in urban settings is a necessity, albeit unpleasant and unsanitary task and one of the main reasons more people do not have cats.

Inventors of the prior art were obviously well aware of the need for a disposable litter container, however there are still limitations in their approaches. One of the major deficiencies in the prior art is that one has to be in close proximity of the animal waste when readying a container for replacement or disposing of the waste material that includes absorbent filler mixed with animal waste. A litter container without handles usually requires one to hold the container with two hands to keep the container level while transporting for disposal as seen in U.S. Pat. No. 4,792,082 to Williamson (1988), U.S. Pat. No. 5,014,649 to Taft (1988) and U.S. Pat. No. 5,337,700 to Toft (1993). This approach has one's hands closer to the animal waste as well as one's nose. Animal wastes smells and is unsanitary.

Several of the prior art litter containers as seen in U.S. Pat. No. 4,487,163 to Jobert (1982), U.S. Pat. No. 5,129,364 to Pirker (1992) and U.S. Pat. No. 5,144,914 to Giannakopoulos (1991) comprising of handles on an end or side of the container designed for carrying the litter container vertically on it side prior to it being used. If one was to dispose of the litter container by using these same handles the filler along with the animal waste would be disturbed as the container went from a horizontal plane to a vertical one thereby increasing the risk of spilling the contents. None of the prior art lifter containers found in my search included a latching handle such as it was usable to carry the litter container in an undisturbed horizontal plane after it has been in use.

Several of the litter containers shown in the prior art use multiple pieces of cardboard or other type panels as in U.S. Pat. No. 5,337,700 to Toft (1993) or use an oversize panel being die cut with a large percent of the panel material going to waste as in U.S. Pat. No. 4,784,082 to Williamson (1988) making the successful commercialization of the product much less likely.

SUMMARY OF THE INVENTION

The present invention is a collapsible disposable lifter container with an improved method of carrying and latching said litter container and contents which include latching handles that permits said litter container to be carried in an undisturbed horizontal plane minimizing shifting of the filler materials and animal waste while in the open and usable condition and additionally after folding down to a compact size to save space for disposal.

A one piece disposable litter container comprising of a bottom member and 2 end panels with folding flaps along with 2 side panels forming a rectangular container along with left and right folding side panels with cutouts and a top member with latching handles and locking tab and support privacy panel forming the collapsible cover.

The litter container is die cut from 1 piece of integral cardboard sheet which when folded in an appropriate fashion results in a compact litter storage container for shipping, storage and disposal.

The litter container may be folded open and held there by the support privacy panel to provide a covered litter container with an end open and suitable for cats and other small animals. By reversing this folding procedure the litter container may be returned to its prior dimensional height.

The handles are latched into the folded side panels at the perimeter of the cutouts and the locking tab inserted into the corresponding orifice to provide a compact, spill resistant container. The above procedure takes approximately 15 seconds per cycle all the while maintaining the litter container in an undisturbed horizontal plane.

DESCRIPTION OF THE PREFERRED EMBODIMENTS

Figure 1:
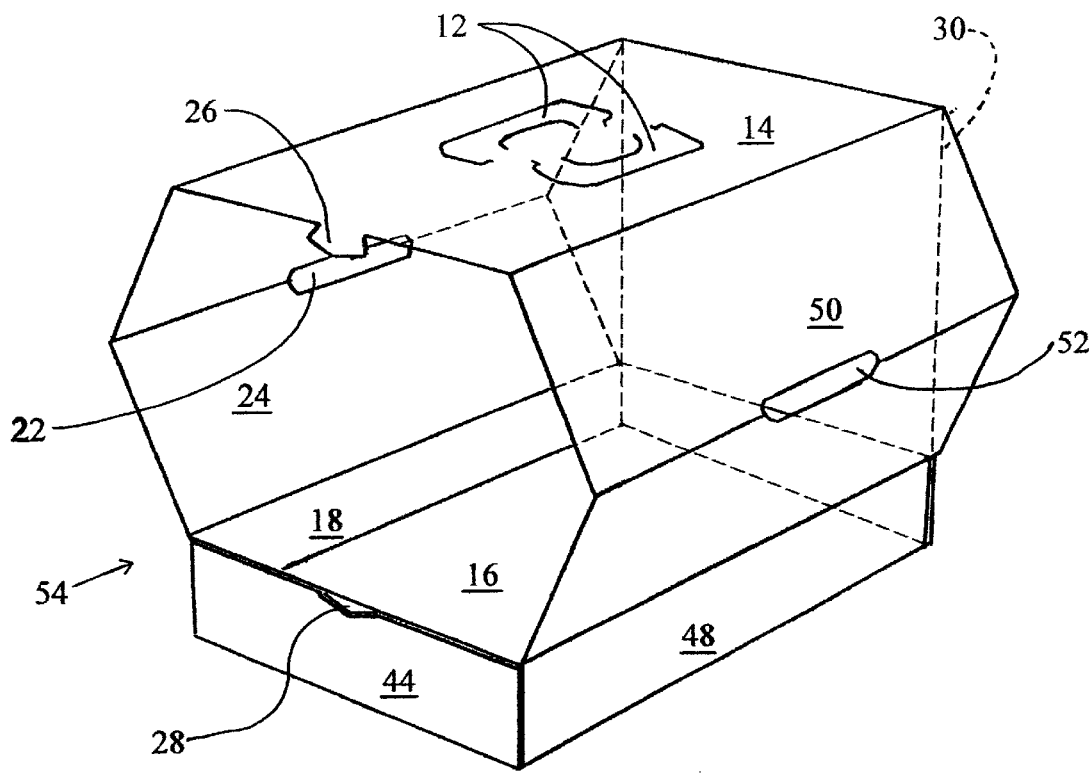
FIG. 1 shows the litter container as assembled, prior to adding filler material.

Referring to FIG. 1 the preferred embodiment of the present invention, a disposable litter container 10 in the open and usable condition and includes latching handles 12, a top member 14 and locking tab 26 a bottom member 16 with two each side panels 18 and 48 and back base panel 20 and front base panel 44 and side panels 24 and 50 with cutouts 22 and 52 a support privacy panel 30 is shown by hidden lines.

Figure 2:
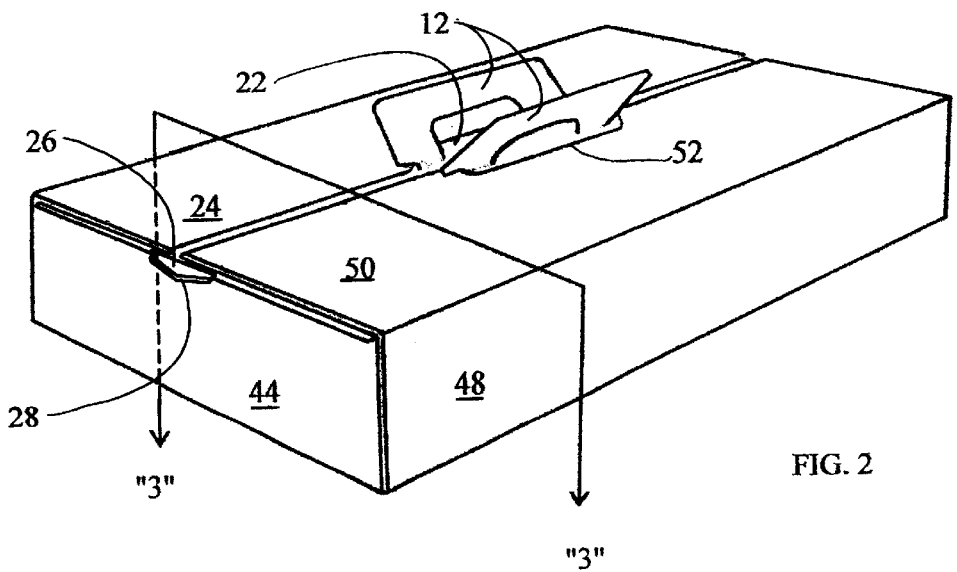
FIG. 2 shows the litter container in its assembled, folded compact condition.

FIG. 2 shows the litter container 10 in a compact condition, such as it would be when purchased with the latching handles 12 secured.

Figure 3:
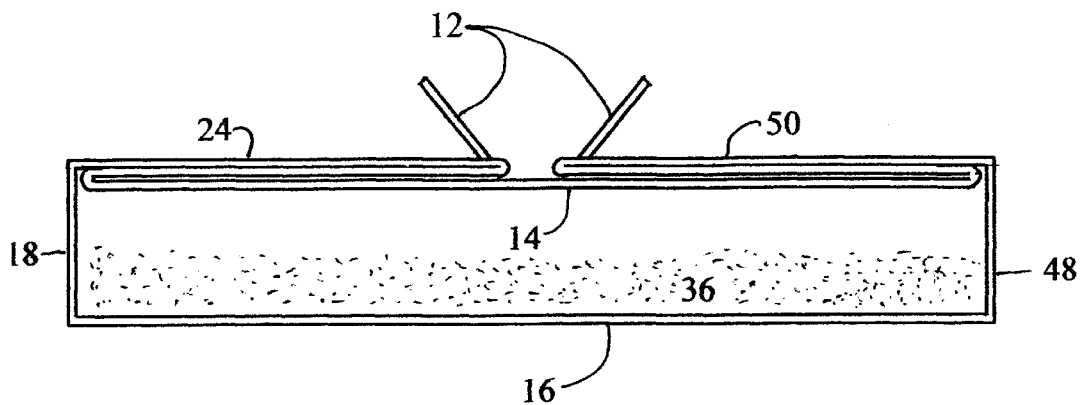
FIG. 3 shows a cross section along the line 3—3 of FIG. 2.

FIG. 3 shows a cross section 3—3 from FIG. 2 with filler material 36 illustrating that the folding panels 24 and 50 fold over the top member 14 and the latching handles 12 serve to hold the side panels 24 and 50 in place, snug against the top member 14.

Figure 4:
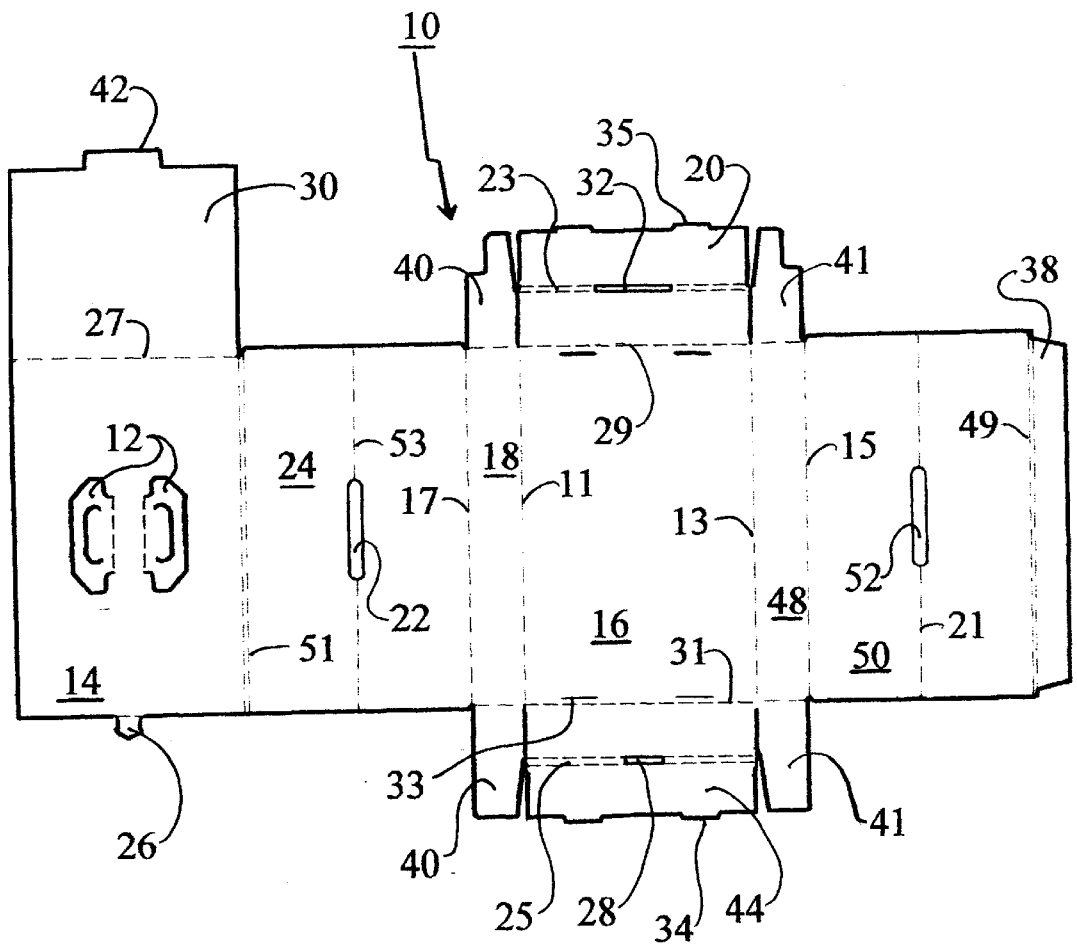
FIG. 4 shows the litter container in a flat panel form prior to folding and assembly.

FIG. 4 shows the complete flat panel layout of the disposable litter container 10 prior to assembly. The preferred material of construction is corrugated cardboard with a smooth finish, of a suitable color such as white. The topside, which becomes the inside of the litter container 10 after assembly would typically be coated with a moisture barrier such as wax or other suitable coating. The support privacy panel 30 serves to hold the top member 14 in the raised position by insertion of the tab 42 into receptacle 32.

Figure 5:
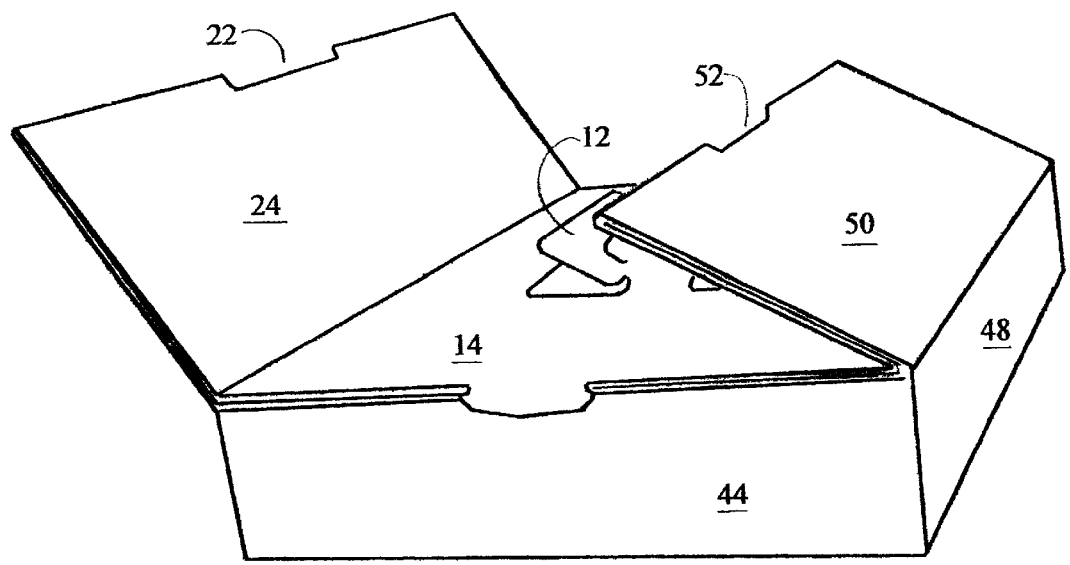
FIG. 5 shows the litter container's folding side panels being opened for use.

FIG. 5 shows the litter container 10 as it is unfolded, with side panels 24 and 50 rotating outward as the latching handles 12 are moved upward.

Figure 6:
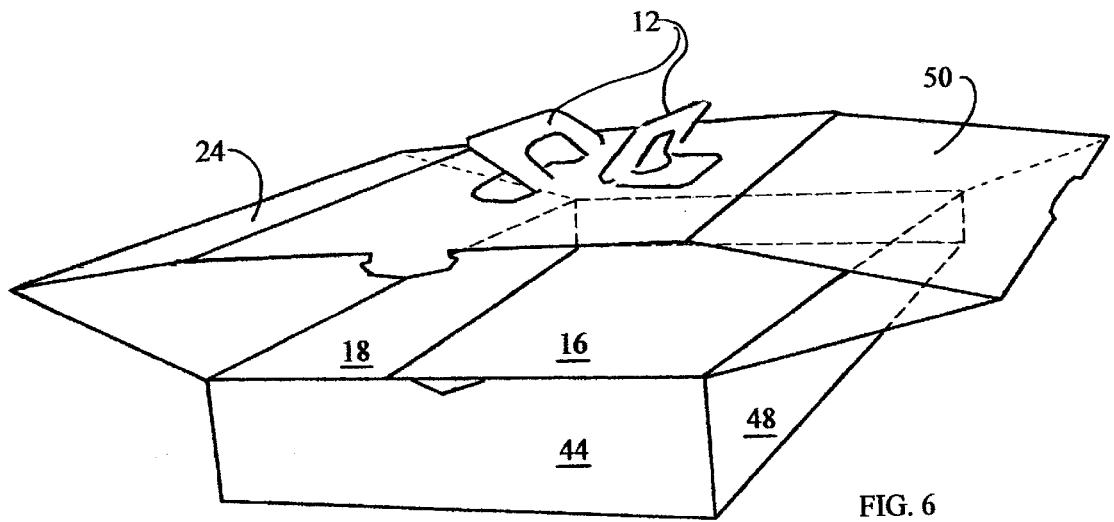
FIG. 6 shows the litter container as the top member is lifted upward to be placed in its in use configuration.

FIG. 6 shows the litter container's 10 side panels 24 and 50 rotated outward and the top member 14 continuing to move upward.

Figure 7:
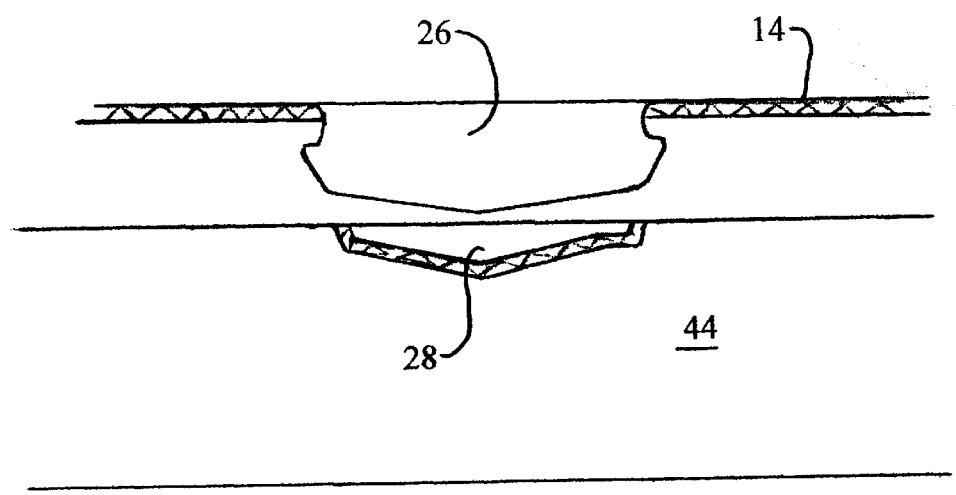
FIG. 7 shows the litter container's locking tab detail.

FIG. 7 shows the detail of the litter container's 10 locking tab 26 of the top member 14 prior to being inserted into its corresponding orifice 28.

Figure 8:
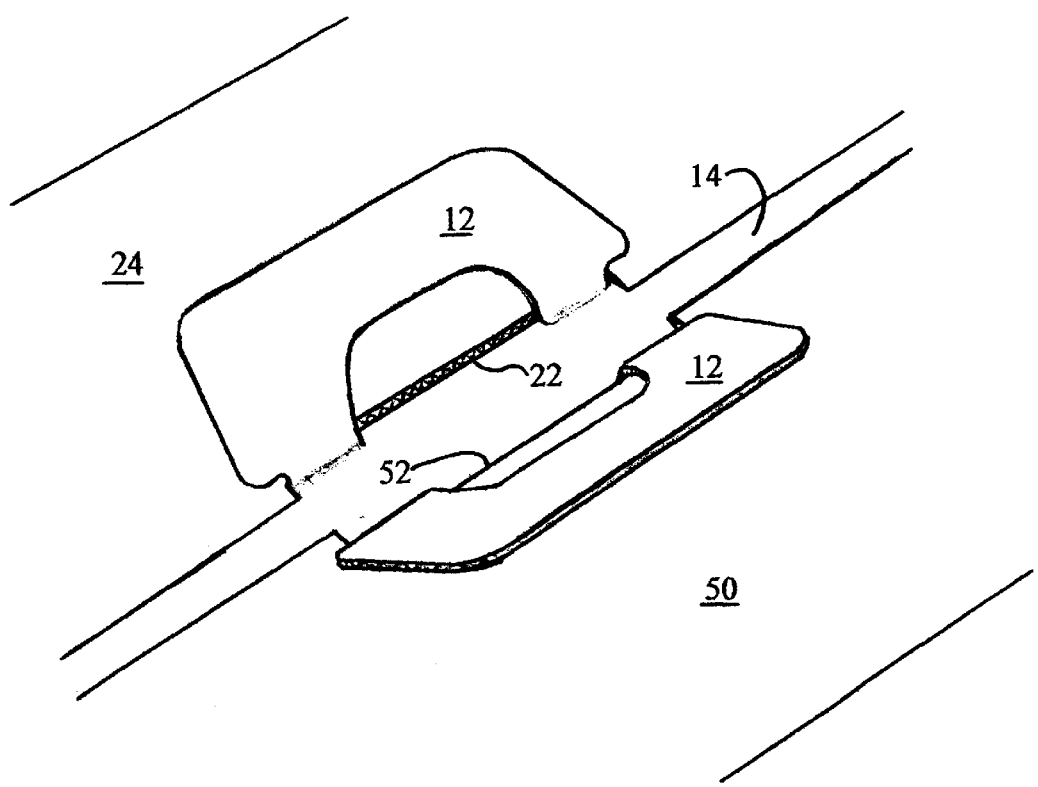
FIG. 8 shows the litter container's latching handles detail as they are latched to the cutout in the folding side panels.

FIG. 8 shows the detail of the litter container's 10 latching handles 12 as they latch to in the cutouts 22 and 52 of the side panels 24 and 50.

Being able to keep the litter container (10) level and compact while transporting it to a trash container is a major advantage of the present invent as compared to the prior art. The one-piece litter container (10) is easy to open, close and dispose of. The specially designed latching handles (12) and top member (14) locking tab (26) fasten the folded side panels (24) and 50 down for a spill resistant covering, helping to maintain sanitation and ease of conveyance.

The litter container (10) has an indefinite shelf life. The litter container (10) was designed for mass commercialization using conventional equipment and methods available through out the world.

Referring to FIGS. 5 and 6

To place the litter container (10) into service, one simply unhooks the latching handles (12) from the cutouts (22) and (52) of the folded side panels (24) and (50) by squeezing the lower portion of the latching handles (12). Then lift up on the latching handles (12) thereby raising the top member (14) which in turn unfolds and raises the side panels (24) and (50) and the support privacy panel (30). Insert tab (42) into the receptacle (32) located in the fold line (23) of the back base panel 20.

For disposal of the litter container, (10) the assembly may be folded back to its original compact size with any filler material (36) and accumulated animal waste by reversing the order of erection mentioned above. Additionally for added spill proof security, the locking tab (26) may be inserted into orifice (28) thereby securing the front portion of the top member (14).

Accordingly, the reader will see that a collapsible, disposable liter container with the latching handles as described, would be convenient, easy to use and help maintain a sanitary approach to disposal of animal waste previously unattainable. In addition, the pre measured filler material which may be supplied with the litter container helps avoid waste and the unpleasant task of adding, or changing the litter as in other litter containers. Furthermore, the disposable litter container has the additional advantages in that,

- it permits the production of litter containers in a variety of colors and designs using existing paper printing equipment to enhance the homes decor;
- it permits a compact solution to litter storage and disposal;
- it permits a biodegradable method of disposal without plastic bags, trays or liners;
- it permits a compact, low cost litter container for traveling pets.

Although the description above contains many specificties, these should not be construed as limiting the scope of the invention but as merely providing illustration of some of the presently preferred embodiments of this invention. For example, the litter container may comprise other shapes such as square, round, etc; alternatively, the placement and size of the latching handles to maintain a closed and latched container, etc.

Thus, the scope of the invention should be determined by the appended claims and their legal equivalents, rather than by the examples given.

I claim:

1. A container of novel construction and manipulation wherein the improvements are comprising:

(a). a container comprised of a sheet of a relatively stiff, foldable material formed into a substantially rectangular platform, said container designating a substantially rectangular perimeter on said sheet so as to delineate a rectangular bottom member, (b). an integrally adjacent front end base panel with an orifice, (c). an integrally adjacent back end base panel with a receptacle, (d). an integrally adjacent left side member comprising a side base panel with folding flaps and a folding side panel with a cutout at a fold line and an gluing strip, (e). an integrally adjacent right side member comprising a side base panel with folding flaps and a folding side panel with a cutout at a fold line, (f). a top member comprising latching handles and locking tab and a integrally adjacent folding support privacy panel with tab, wherein securing of each corner of the base panels at the intersection between the side base panels and the end base panels forms a substantially ridged, permanently shaped container, and wherein raising or lowering the top member allows rotation of the side panels, and wherein the support privacy panel holds open the top member and right and left side members, and wherein the latching handles secure the top member and side members closed, and wherein the locking tab secures the top member to the front base panel when closed.

2. The container of claim 1 wherein the latching handle will clasp the perimeter of the cutout in the fold line of the right and left folding side panels, thus maintaining a securing of the folded side panels along with the retracted top member to a shorten height.

3. The container of claim 2 comprising exterior colorings.

4. The container of claim 1 wherein the top member additionally is secured closed by means of an integral adjacent locking tab inserted into a orifice of the front end base panel.

5. The container of claim 4 wherein said container is folded closed to a collapsed height for storage, shipping and disposal and folded open to an open height large enough for animal use, and wherein said container may contains a prescribed amount of litter to be used along with the container for animal waste collection and then discarded as a whole.

6. The container of claim 5 wherein there is at least one open end to allow a cat or other small mammal to enter and exit.

7. The container of claim 5 wherein latching handles are integrated into the top member for transporting the container in an upright position both opened and closed.

8. The container of claim 7 wherein the side panels, both right and left, fold over and hold down the top member to the perimeter of the side and end base panels.

9. The container of claim 8 wherein the top member is held in the upright opened position by the integrally adjacent support privacy panel.

10. The container of claim 4 further comprising a non-permeable barrier lining.

\* \* \* \* \*